United States Patent
Miramontes

(10) Patent No.: US 7,581,893 B2
(45) Date of Patent: Sep. 1, 2009

(54) U-COVER CAMERA PHONE

(76) Inventor: Ivan Miramontes, P.O. Box 2073, Rancho Cucamonga, CA (US) 91729

( * ) Notice: Subject to any disclaimer, the term of this patent is extended or adjusted under 35 U.S.C. 154(b) by 363 days.

(21) Appl. No.: 11/787,363

(22) Filed: Apr. 17, 2007

(65) Prior Publication Data
US 2007/0242948 A1 Oct. 18, 2007

Related U.S. Application Data

(60) Provisional application No. 60/792,394, filed on Apr. 17, 2006.

(51) Int. Cl.
*H04N 1/00* (2006.01)
*G03B 17/00* (2006.01)
(52) U.S. Cl. .................... 396/448; 455/575.1
(58) Field of Classification Search ............... 396/448
See application file for complete search history.

(56) References Cited

U.S. PATENT DOCUMENTS

| 7,231,188 B2 * | 6/2007 | Godston et al. ............ 455/73 |
| 7,332,701 B2 * | 2/2008 | Van Arendonk et al. .. 250/208.1 |
| 7,471,888 B2 * | 12/2008 | Maeda et al. ................ 396/72 |
| 2003/0036365 A1 * | 2/2003 | Kuroda ........................ 455/90 |
| 2007/0087792 A1 * | 4/2007 | Teuri et al. ............... 455/575.1 |
| 2008/0268901 A1 * | 10/2008 | Miramontes ............. 455/556.1 |

* cited by examiner

*Primary Examiner*—Melissa J Koval
(74) *Attorney, Agent, or Firm*—Robert M. M. Seto

(57) ABSTRACT

An active lens cover for a device, such as a smart phone with a dual lens camera. The camera lens that faces the user and the camera lens that faces away from the user are not directly behind each other, but are slightly offset. The active lens cover is advantageously in the shape of a "U", which allows a single cover to be used to protect both lenses. The offset arrangement of the two lenses allows the facing lens be exposed by sliding the lens cover in one direction, and the away lens to be exposed by sliding the lens cover in the opposite direction. When the lens cover is slid to expose the facing camera lens, the camera phone automatically turns ON and enters a preselected operating mode. When the cover is slid in the opposite direction to expose the away camera lens, the camera phone automatically turns ON and enters another pre-selected operating mode. The housing of the U-cover includes at least one sensor that tells the device's CPU what hardware to activate. In the preferred embodiment, the user is able to seamlessly switch between transmitting a video feed from either camera during a telephone call.

20 Claims, 5 Drawing Sheets

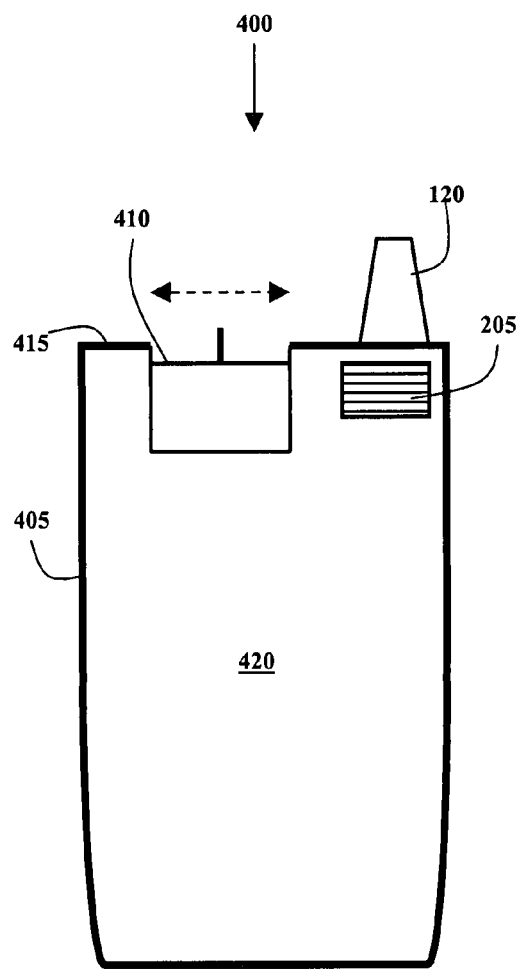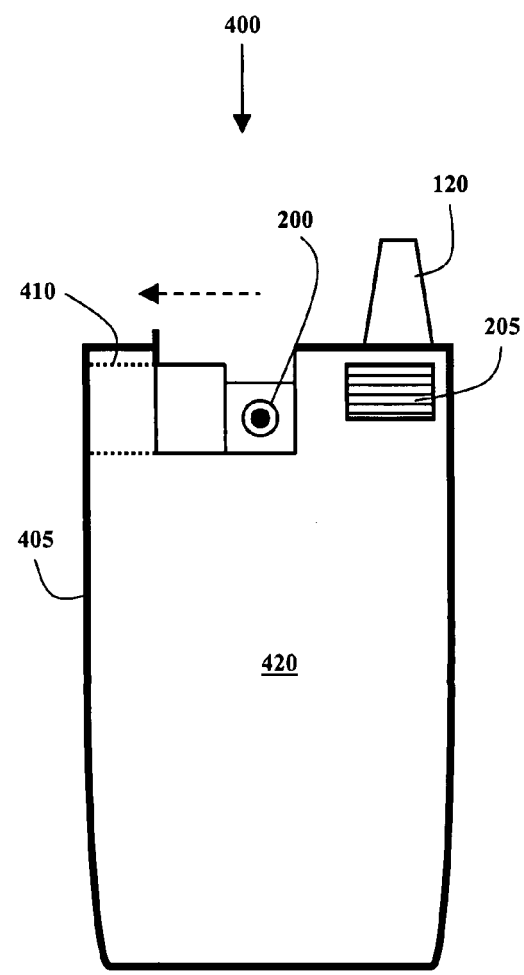
Figure 4(a)                    Figure 4(b)

U-COVER CAMERA PHONE

The present invention was originally disclosed in U.S. provisional patent application Ser. No. 60/792,394 filed on Apr. 17, 2006, and priority is claimed to the provisional patent application. The present invention was also disclosed in USPTO Disclosure Document Number 609,862 filed on Dec. 6, 2006.

BACKGROUND OF THE INVENTION

The present invention relates generally to the field of cellular telephones and more specifically to a dual camera lens smart phone with a U-shaped lens cover.

Cellular telephones have become an omnipresent device in society today. Manufacturers have added so many additional features to cellular telephones that it is easy to forget they also make telephone calls. Cellular telephones that double as an Internet browser, an MP3 player, a camera or a camcorder have recently acquired the name smart-phones. These smart-phones have benefited from continued miniature-rization of integrated circuits. Camera phones can now take high-resolution pictures and even act as movie cameras because of the increased density available in memory chips. In order to take a high-resolution picture, the camera phones must include a delicate, high quality lens. Just as the lens on an expensive film camera needs a lens cap to protect the lens, so too should a high quality lens on a camera phone have a lens cover to provide protection.

The image quality of a digital camera depends on the number of pixels available in the solid-state image sensing device in the camera, such as a Charge Coupled Device (CCD). The solid-state image sensing device found in a traditional digital camera is a VGA-class device, which provides approximately 330 K pixels. The image quality of VGA cameras are low when compared to the image quality of conventional film cameras. However, VGA camera are more than sufficient for use as a "user facing" camera. Such digital camera are often found on the tops of display screens of laptop computers and on the monitors of desktop computers. Cameras that face the user allow the user to transmit their image to others, during a texting "chat" session or during a voice and video tele-conference, for example.

Traditional digital cameras and camera phones have one "On" button that the user must locate and press before they can use any feature on the device. What is needed in the field is a camera phone that allows the user to take a picture, or video, simply by opening the lens cover.

SUMMARY OF THE INVENTION

A portable electronic device, such as a cellular telephone, that includes a dual lens digital camera. The camera phone comprises a device body, first and second camera lenses, and a U-shaped lens cover. The device body has a user side that faces the user, and an away side that faces away from the user during normal operations. The first camera lens faces the user and is housed on the user side of the device body. The second camera lens faces away from the user and is housed on the away side of the device body. The U-shaped lens cover is slide-ably attached to the device body and is able to move between three different positions. In the first position, also called the closed position, the U-shaped lens cover covers and protects both the first and second lenses. In the second position, only the facing lens is exposed. In the third position, only the away lens is exposed. The device automatically switches from a powered OFF state to a powered ON state when the U-shaped lens cover is slid from the first position to either of the second or third positions. The user is then free to use the device in a selected camera mode.

In the preferred embodiment, when the facing lens is exposed, the camera phone enters a telephone video conference mode, which activates the facing camera and dials a preset telephone conference number. The first camera lens is preferably adapted for taking low-resolution pictures and videos, and the away camera lens preferably includes a zoom feature and is adapted for taking high-resolution pictures and videos. The U-shaped lens cover is slide-ably attached to the exterior of the device body, making it very easy for the user to slide the cover from the closed position to the second or third positions. In an alternative embodiment, the U-shaped lens cover is housed within the interior of the device body and the sides of the lens cover slide into hollow spaces in the interior of the device body, when slid to the second or third positions. The device also preferably includes a re-useable flash that is permanently attached to the away side of the device body.

It is an object of the present invention to provide an easy-ON feature for an electrical device with a dual lens camera.

It is another object of the present invention to provide an active lens cover that is capable of protecting both lenses in a dual lens camera.

It is yet another object of the present invention to provide a smart camera phone that is capable of going from an OFF state to at least two different ON states simply by moving/opening the lens cover.

BRIEF DESCRIPTION OF THE DRAWINGS

The invention of the present application will now be described in more detail with reference to the accompanying drawings, given only by way of example, in which:

FIG. 4(a) is a back view of an alternative embodiment with the U-cover in the closed position;

FIG. 4(b) is a back view of the alternative embodiment with the U-cover in the open position; and, FIG. 5 is flow chart showing exemplary steps in a method for operating the present device.

DETAILED DESCRIPTION OF THE INVENTION

Figure 1A:
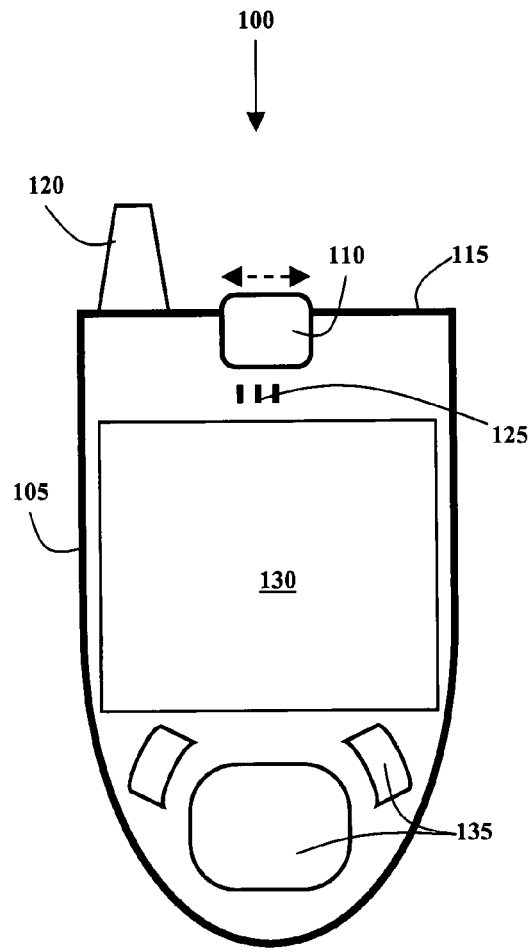
FIG. 1(a) is a frontal view of the preferred embodiment with the U-cover in the closed position.

FIG. 1(a) is a frontal view of the preferred embodiment 100 of the present U-Cover Camera Phone, which can generically be referred to as a smart-phone, meaning that the preferred embodiment 100 provides cellular telephone capabilities and additional capabilities. In this case, current cellular telephone capabilities, including picture and ring tone caller ID, voice mail, address book and call logs, have been enhanced with the capabilities of a dual lens digital camera, discussed further below. The preferred embodiment 100 of the present camera phone includes a cell phone body 105 and a multi-purpose U-shaped cover 110 that is slide-ably attached to the top 115 of the cell phone body. The cover 110 can slide and temporarily lock in three different positions. The U-shaped cover, or U-cover, 110 shown in FIG. 1(a) is in the first position, or closed position. In the closed position, the U-cover 110 covers both camera lenses and the internal camera hardware is in an OFF mode. The preferred embodiment 100 also includes an antenna 120, speaker grill 125, display screen 130, and control buttons 135. In the preferred smart phone, the display screen 130 is a touch screen and when the user wants to place a call, a virtual keypad is displayed on the screen 130 for entry of a telephone number by the user. In other embodiments, an numeric keypad or full QWERTY keypad is provided in place of control buttons 135, or a numeric or QWERTY keypad is provided in a second keypad that is slide-ably or fold-ably attached. While the U-cover 110 is in the closed position, all other features of the smart-phone 100, besides those requiring a camera, are still available to the user.

Figure 1B:
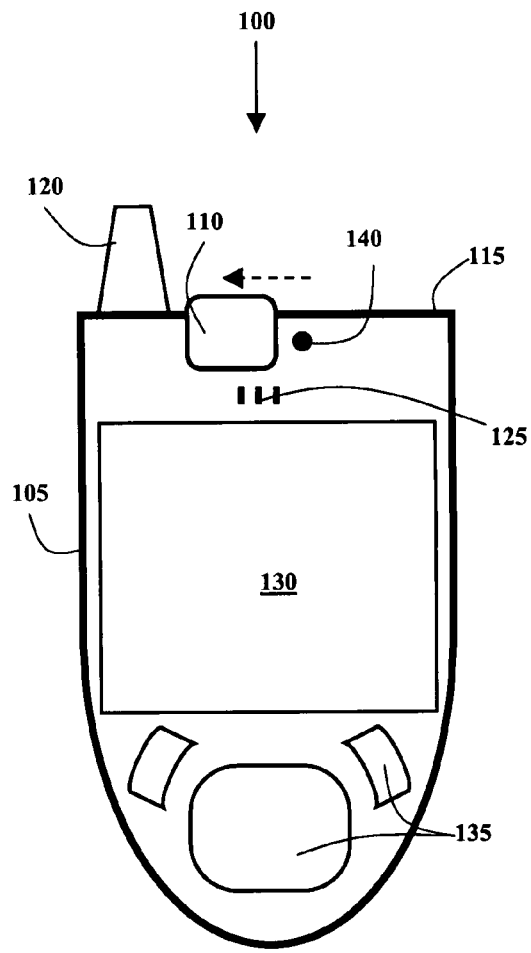
FIG. 1(b) is a frontal view of the preferred embodiment with the U-cover in the open position.

FIG. 1(b) shows the preferred smart phone 100 with the U-cover 110 in the second position, revealing the first digital camera lens 140, which faces the user during normal operations. The "facing" digital camera lens 140 only needs to be a medium quality VGA lens. The facing camera lens 140 is designed for transmitting the user's face, which is typically a fixed distance from the smart phone 100, so the camera's lens can be fixed and fairly inexpensive. The facing camera lens 140 is designed to transmit the user's image, primarily the face, during telephone-video conferences. A contact sensor is provided between the U-cover 110 and the top 115 of the phone body 105 to send a "facing lens" signal to the camera phone's central processing unit when the facing camera lens is exposed. The "facing lens" signal causes hardware associated with the facing camera and the telephone to be activated. The hardware then enters a preset default mode. In the preferred embodiment, the default mode causes the camera phone to initiate a telephone video conference. When the camera phone is OFF, the user can cause the preferred embodiment 100 to turn ON and initiate a tele-conf. video call simply by sliding the U-cover 110 to the second position, thereby exposing the facing camera 140. The contact sensor is preferably incorporated within a catch that temporarily locks the U-cover 110 in the second position. In the preferred embodiment, the U-cover 110 is able to temporarily lock in three different positions, in the first position both lenses are covered, in the second position only the "facing lens" is exposed, and in the third position only the "away lens" is exposed. A biased detent and three indents are preferably used to provide the locking ability of the U-cover.

Figure 2A:
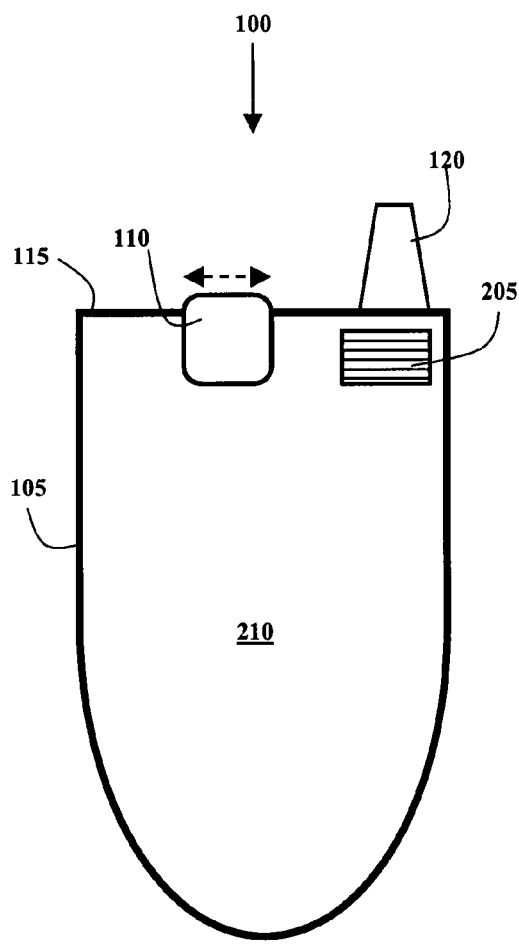
FIG. 2(a) is a back view of the preferred embodiment with the U-cover in the closed position.

FIG. 2(a) shows the back 210 of the preferred embodiment 100 with the U-cover 110 in the first, or closed, position. The back 210 of the preferred smart phone includes a re-useable flash 205 that is permanently attached to the camera phone. The flash 205 is designed to work in conjunction with the second camera lens. The second camera lens is covered by the U-cover 110 when the cover 110 is in the first and second positions.

Figure 2B:
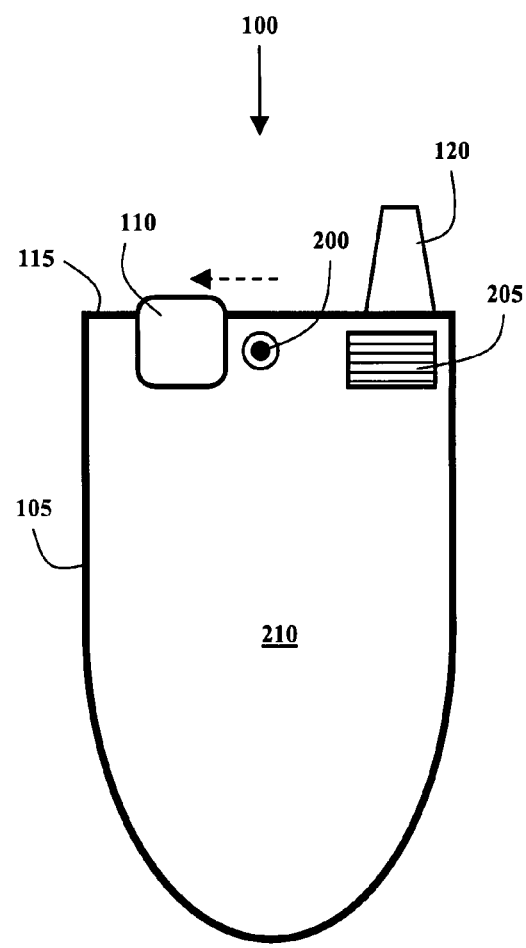
FIG. 2(b) is a back view of the preferred embodiment with the U-cover in the open position.

FIG. 2(b) shows the back 210 of the preferred embodiment 100 with the U-cover 110 in the third position, wherein the second digital camera lens 200, the "away camera", is exposed. The second digital camera lens 200 is designed to operate with the same image capturing hardware in the camera phone as the first camera lens. Since, the second camera lens is capable of taking high-resolution pictures, the image capturing hardware preferably allows for the storage of more image information from the second camera. The second lens 200 faces away from the user, allowing the user to take pictures of subjects in front of him without having to the turn the camera phone around. This arrangement also allows the camera phone's display screen to be used as a viewfinder. A second contact sensor is provided between the U-cover 110 and the top 115 of the phone body 105 to send an "away lens" signal to the camera phone's central processing unit when the away camera lens is exposed, i.e., when the U-cover is moved to the third position. The "away lens" signal causes hardware associated with the away camera to be activated. The hardware then enters a preset default mode. When the camera phone is OFF, the user can cause the preferred embodiment 100 to turn ON and start shooting video simply by sliding the U-cover to the third position, and exposing the away camera lens 200. The contact sensor is preferably incorporated within a catch that temporarily locks the U-cover 110 in the third position.

The second, or "away", camera lens 200 is a high quality lens, preferably with zooming capabilities, that allows the user to take near and far away pictures and videos. The hardware and software in the preferred embodiment 100 allow pictures and videos to be stored and retrieved later, for display, playback, editing and/or for transmission. The software includes a graphical user interface that allows the user to select from all of the camera phone's features.

Figure 3:
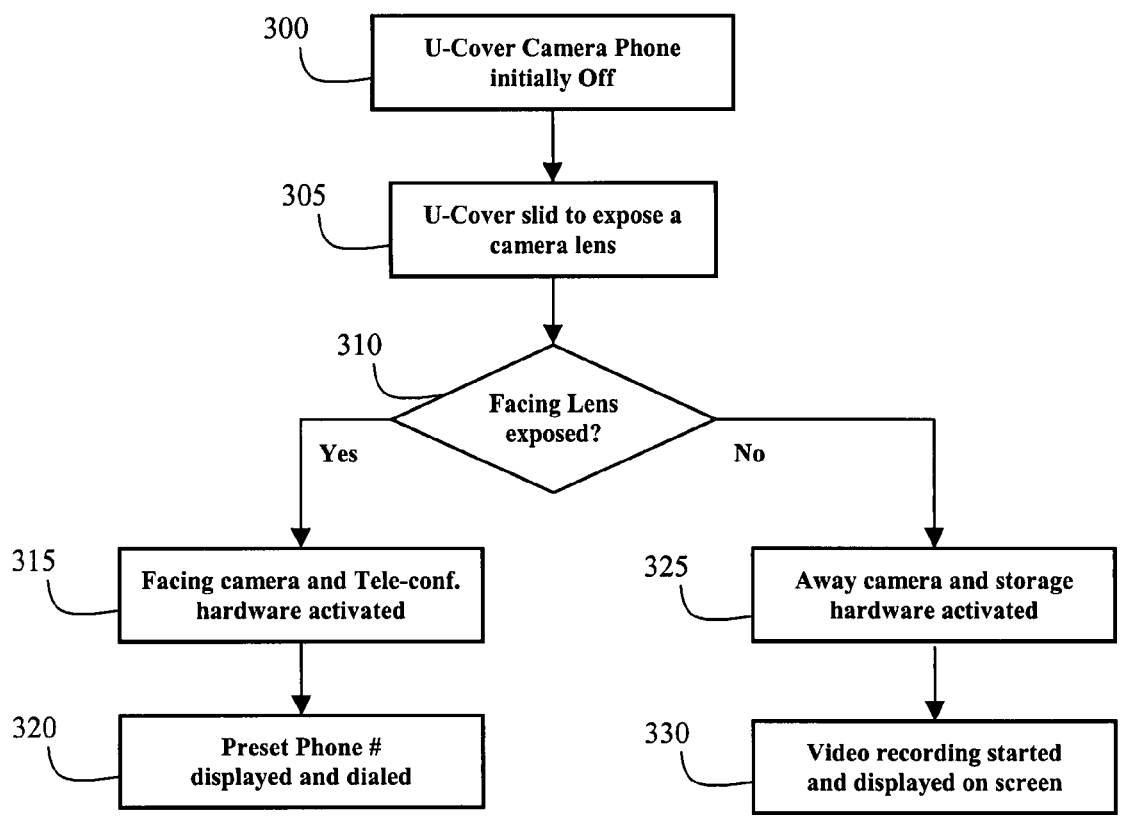
FIG. 3 is a flow chart showing an exemplary method for using the preferred embodiment.

FIG. 3 is a flow chart showing an exemplary method for using the preferred embodiment of the present U-Cover Camera Phone. When the present camera phone is ON, the user is free to select any of the camera's functions at any time. However, the additional functionality in this smart phone allows the user to pick up the phone, while in the OFF state, slide the U-Cover to the second or third position, and immediately start using the camera phone. In step 300, the camera phone is powered OFF and the U-Cover is in the first, or closed, position. In this state, the camera phone is not in use and may be in a pocket, a purse, or a briefcase. In step 305, the user decides he wants to use the camera phone, so he grabs the phone and slides the U-Cover to expose a desired camera lens. In response to the U-Cover being moved to an Open position, circuitry in the smart phone automatically causes the phone to turn ON and determines which lens is being exposed, step 310. If the facing lens is exposed, then in step 315, all hardware associated with the facing camera and teleconferencing is activated. In step 320, a preset telephone number is displayed and automatically dialed. In the preferred embodiment, the default mode for the facing lens is the telephone-video conference mode. Thus, the facing camera and the call connection features are activated. The default mode can be changed according to the preferences of the user.

If the lens that is exposed is the "away" lens, then in step 325, the hardware associated with the away camera is activated. In step 330, the video recording, including audio, starts and the phone's display screen is used as a viewfinder. The active U-Cover on the present camera phone basically provides the user with two different "fast ON" buttons for the device. The second position allows fast initiation of a teleconference, and the third position allows fast initiation of video recording.

FIG. 4(a) shows the back 420 of an alternative embodiment 400 of the present invention with the U-Cover 410 in the closed position. This embodiment 400 can be almost any electronic device, including a flip or slider smart phone, a cordless landline telephone, a Personal Digital Assistant (PDA), a portable gaming device, and even a laptop computer. The alternative device may include a permanent flash 205 and/or an antenna 120. In this alternative embodiment 400, the U-Cover 410 is housed within the body 405 of the device, and the cover slides just below the top 415 of the device. This interior design of the U-Cover allows for a sleeker, less bulky, exterior form of the electronics device. The U-Cover 410 is in the first position in FIG. 4(a). In the first position, both camera lenses are covered. If the user slides the U-Cover 410 toward the antenna 120, the camera lens facing the user will be exposed, and just as in the preferred embodiment the device will turn ON and enter a preset mode. If the user slides the U-Cover 410 away from the antenna 120, the camera lens that faces "away" from the user will be exposed, as is shown in Figure (b).

FIG. 4(*b*) shows the back 420 of the alternative embodiment 400 with the U-Cover 410 in the third position. When the U-Cover 410 is in the third position, the second, or away, camera lens 200 is exposed and may be used to take pictures and videos, depending on the desires of the user. The "away" lens 200 preferably includes zoom features, however other embodiments do not require a zoom feature. When the U-Cover 410 is in the second or third position, the cover slides into gaps in the device's body 405, just below the top 415 of the device. The U-Cover 410 of the alternative embodiment 400 is still an active, dual purpose, dual lens cover. When the electronic device 400 is powered OFF, the user can turn it ON simply by sliding the U-Cover 410 to the second or third position.

Figure 5:
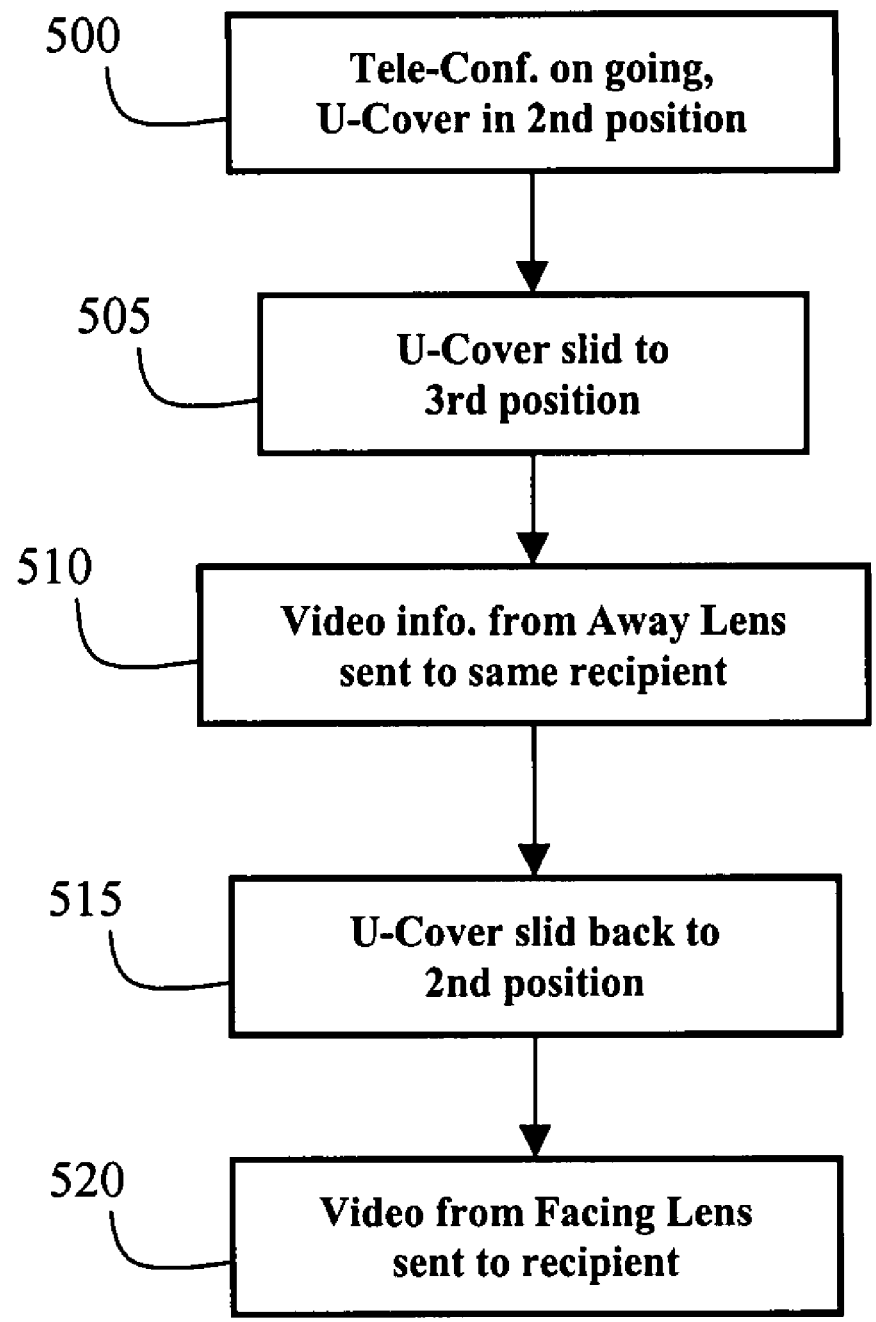

FIG. 5 shows steps in an exemplary method of operating the preferred embodiment. Initially, in step 500, the user is participating in a video telephone conference, wherein video information from the facing camera is transmitted to a recipient. During the conference, the user finds it necessary to shoot video of a subject in front of him and have it sent to the person with whom he is tele-conferencing. So, in step 505, the user slides the U-cover from the second position to the third position. The present camera phone, automatically and without interruption, in step 510, starts sending the video feed from the away camera to the conferencing party. After the required amount of video information is sent from the away camera, the user slides the U-cover back to the second position, in step 515. The feed from the away camera ends and the recipient seamlessly begins receiving the video feed from the facing camera again, step 520. The above capability can prove very useful to reporters and others that work "in the field" and find it necessary to share images that they see with others.

The foregoing description of the specific embodiments will so fully reveal the general nature of the invention that others can, by applying current knowledge, readily modify and/or adapt for various applications such specific embodiments without departing from the generic concept. For example, a different shaped lens cover could be provided for differently shaped lens. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. A portable electronic device that includes operating software, a central processor, and camera hardware, wherein the camera hardware includes two camera lenses, the electronic device comprising:
   a device body, the device body having a user side that faces the user during normal operations, and an away side that faces away from the user during normal operations;
   a first camera lens, wherein the first camera lens is housed on the user side of the device body;
   a second camera lens, wherein the second camera lens is housed on the away side of the device body; and,
   a U-shaped lens cover that is slide-ably attached to the device body, wherein the U-shaped lens cover covers and protects both the first and second lenses while in a first position, exposes only the first lens while in a second position, and exposes only the second lens while in a third position.

2. The device of claim 1, wherein the device automatically switches from a powered OFF state to a powered ON state when the U-shaped lens cover is slid from the first position to either the second or third positions.

3. The device of claim 2, wherein the device automatically enters a telephone video conference mode when the lens cover is slid to the second position.

4. The device of claim 2, wherein the device automatically enters an away camera mode that allows a user to take a picture or video when the lens cover is slid to the third position.

5. The device of claim 1, wherein image information can be acquired through either camera lens, and transmitted to a recipient, at the same time the user is caring on a telephone conversation with the recipient, and wherein the lens cover can be temporarily locked in the first, second and third positions.

6. The device of claim 1, wherein the U-shaped lens cover is housed within an interior of the device body and the lens cover is slide-ably attached to the interior of the device body.

7. The device of claim 1, further comprising a re-useable flash that is permanently attached to the away side of the device body, and wherein the U-shaped lens cover is slide-ably attached to an exterior of the device body.

8. A cellular telephone that includes operating software, a central processor and camera hardware, including two camera lenses, the cellular telephone comprising:
   a device body, the device body having a user side that faces the user during normal operations, and an away side that faces away from the user during normal operations;
   a first camera lens that is housed in the user side of the device body;
   a second camera lens that is housed on the away side of the device body; and,
   a U-shaped lens cover that is slide-ably attached to the device body, wherein the U-shaped lens cover covers and protects both the first and second lenses while in a first position, exposes only the first lens while in a second position, and exposes only the second lens while in a third position.

9. The telephone of claim 8, wherein the telephone automatically switches from a powered OFF state to a powered ON state when the U-shaped lens cover is slid from the first position to either the second or third positions.

10. The telephone of claim 9, wherein the telephone automatically enters a telephone video conference mode when the lens cover is slid to the second position.

11. The telephone of claim 9, wherein the telephone automatically enters an away camera mode that allows a user to take a picture or video when the lens cover is slid to the third position.

12. The telephone of claim 8, wherein the U-shaped lens cover is slide-ably attached to an exterior of the device body.

13. The telephone of claim 8, wherein the U-shaped lens cover is housed within an interior of the device body and the lens cover is slide-ably attached to the interior of the device body.

14. The telephone of claim 8, wherein image information can be acquired through either camera lens, and transmitted to a recipient, at the same time the user is caring on a telephone conversation on the telephone with the recipient.

15. The telephone of claim 8, further comprising at least one sensor that is provided between the U-shaped lens cover and the device body, wherein the sensor is electrically connected to the central processor and the sensor sends a signal to the central processor when the lens cover is moved to the second or third positions.

16. The telephone of claim 15, wherein the signal causes the telephone to turn ON and enter a pre-selected operating mode.

17. The telephone of claim 8, further comprising an image memory module that allows for storage, retrieval and editing of pictures and videos captured by the camera hardware.

18. The device of claim 1, further comprising at least one sensor between the U-shaped lens cover and the device body, wherein the sensor is electrically connected to the central processor and the sensor sends a signal to the central processor when the lens cover is moved to the second or third positions.

19. The device of claim 18, wherein the signal causes the device to turn ON and enter a pre-selected operating mode.

20. The device of claim 1, further comprising an image memory module that allows for storage, retrieval and editing of pictures and videos captured by the camera hardware.

* * * * *